(12) United States Patent
Yeoum et al.

(10) Patent No.: US 10,064,118 B2
(45) Date of Patent: Aug. 28, 2018

(54) METHOD FOR OPERATING COMMUNICATION FUNCTION AND ELECTRONIC DEVICE SUPPORTING THE SAME

(71) Applicant: Samsung Electronics Co., Ltd., Gyeonggi-do (KR)

(72) Inventors: Taesun Yeoum, Seoul (KR); Kyuhyun Kim, Gyeonggi-do (KR); Hyongjin Ban, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 14/326,409

(22) Filed: Jul. 8, 2014

(65) Prior Publication Data

US 2015/0009918 A1 Jan. 8, 2015

(30) Foreign Application Priority Data

Jul. 8, 2013 (KR) ........................ 10-2013-0079432

(51) Int. Cl.
*H04L 12/701* (2013.01)
*H04W 40/02* (2009.01)
(Continued)

(52) U.S. Cl.
CPC ....... *H04W 40/02* (2013.01); *H04L 29/06027* (2013.01); *H04L 65/1016* (2013.01);
(Continued)

(58) Field of Classification Search
CPC ..... H04W 40/02; H04W 72/04; H04W 88/06; H04M 7/006
See application file for complete search history.

(56) References Cited

U.S. PATENT DOCUMENTS 6,651,111 B2 11/2003 Sherman et al.
7,886,311 B2 2/2011 Yao et al.
(Continued)

FOREIGN PATENT DOCUMENTS

CN 101622901 A 1/2010
CN 102707997 A 10/2012
(Continued)

OTHER PUBLICATIONS

International Search Report dated Oct. 23, 2014 in connection with International Application No. PCT/KR2014/006112; 3 pages.
(Continued)

*Primary Examiner* — Hoon J Chung

(57) ABSTRACT

An electronic device can provide a communication function on the basis of at least one network among a plurality of networks, and a method for operating a communication function thereof. The electronic device includes at least one communication module that can provide a communication function based on a plurality of networks. The electronic device includes an Radio Interface Layer (RIL) module that can support a processing of data transmitted and received through at least one communication module of the communication modules. The electronic device includes a virtual communication module can support a processing of data transmitted and received through at least one communication module of the communication modules and can perform data processes through the RIL module, wherein the RIL module can form a path with the communication modules, or can form a path with the communication modules through the virtual communication module according to the type of communication function.

12 Claims, 8 Drawing Sheets

(51) Int. Cl.
  *H04L 29/06* (2006.01)
  *H04W 36/00* (2009.01)
  *H04W 36/14* (2009.01)
(52) U.S. Cl.
  CPC ...... *H04L 65/1059* (2013.01); *H04L 65/1069* (2013.01); *H04W 36/0022* (2013.01); *H04W 36/14* (2013.01)

(56) References Cited

U.S. PATENT DOCUMENTS

| | | | |
|---|---|---|---|
| 7,995,562 B2 | 8/2011 | Purnadi et al. | |
| 8,134,978 B2 | 3/2012 | Purkayastha et al. | |
| 8,666,437 B2 | 3/2014 | Stromberg et al. | |
| 2002/0147853 A1 | 10/2002 | Sherman et al. | |
| 2004/0176023 A1 | 9/2004 | Linder et al. | |
| 2006/0225082 A1* | 10/2006 | Yao | G06F 9/547 719/328 |
| 2007/0291791 A1* | 12/2007 | English | H04L 45/00 370/469 |
| 2008/0198841 A1* | 8/2008 | Desorbay | H04L 63/0281 370/352 |
| 2009/0201879 A1 | 8/2009 | Purkayastha et al. | |
| 2011/0002267 A1 | 1/2011 | Dwyer et al. | |
| 2011/0165896 A1 | 7/2011 | Stromberg et al. | |
| 2011/0188451 A1* | 8/2011 | Song | H04W 36/0033 370/328 |
| 2011/0286343 A1 | 11/2011 | Powell et al. | |
| 2013/0301529 A1 | 11/2013 | Lindsay et al. | |
| 2014/0189155 A1* | 7/2014 | Morris | H04L 61/6004 709/238 |
| 2015/0140985 A1 | 5/2015 | Li et al. | |

FOREIGN PATENT DOCUMENTS

| | | |
|---|---|---|
| EP | 2663054 A3 | 11/2013 |
| KR | 20100087054 A | 8/2010 |

OTHER PUBLICATIONS

Mun-Suk Kang, et al., "PSTN and VoIP Service Interworking", Feb. 2002, 12 pages.
European Patent Office, "Supplementary European Search Report," Application No. 14823312.5-1854, dated Nov. 21, 2016, 12 pages, publisher EPO, Munich, Germany.
Office Action dated May 2, 2018 in connection with Chinese Patent Application No. 201480037377.2.

\* cited by examiner

METHOD FOR OPERATING COMMUNICATION FUNCTION AND ELECTRONIC DEVICE SUPPORTING THE SAME

CROSS-REFERENCE TO RELATED APPLICATION(S) AND CLAIM OF PRIORITY

The present application can be related to and claims priority from and the benefit under 35 U.S.C. § 119(a) of Korean Patent Application No. 10-2013-0079432, filed on Jul. 8, 2013, which is hereby incorporated by reference for all purposes as if fully set forth herein.

TECHNICAL FIELD

The present disclosure relates to communication functions of electronic devices.

BACKGROUND

Some of the electronic devices which adopt a communication function are manufactured and sold. Recently, these electronic devices are being rapidly developed, thanks to the support of hardware and software.

The conventional electronic devices can have communication modules for the performance of a communication function, and can perform a connection with networks that support communication modules. At this time, since the typical networks can be comprised of various communication networks, the electronic devices can adopt respective communication modules for the connection with the various communication networks, and application programs (hereinafter referred to as "apps") for supporting a communication function, which can be executed on the basis of each communication module, and can be separately prepared and installed in accordance with the respective communication modules. In addition, it can be tiresome to activate the installed communication function apps respectively to conform to each communication network. Furthermore, in a case of conversion between communication networks, the continuity of communication can be broken.

Accordingly, the present disclosure describes a method for operating a communication function by which an improved communication function can be operated, and an electronic device supporting the same.

SUMMARY

To address the above-discussed deficiencies, it is a primary object to provide an electronic device configured to provide a communication function on the basis of at least one network of a plurality of networks. The electronic device includes a first processor that includes an app configured to support a communication function, an operating system configured to support the operation of the app, an Radio Interface Layer (RIL) module configured to support a communication function of the operating system, and a virtual communication module configured to transform circuit-typed data provided by the RIL module to packet-typed data, and transform received packet-typed data to data that is recognizable by the RIL module. The electronic device can also include a circuit switch based (CS) communication module configured to support the circuit type. The electronic device can further include a packet switch based (PS) communication module configured to support the packet type.

In a first example, a method for operating an electronic device providing a communication function on the basis of at least one network of a plurality of networks includes receiving a phone call by a packet switch based communication module of a plurality of communication modules. The method also includes transferring the received phone call to a virtual communication module and transforming the data type. The method further includes transferring the transformed data to an operating system and an app through an RIL module.

In a second example, a method for operating an electronic device providing a communication function on the basis of at least one network of a plurality of networks includes receiving a request for a communication function from an app. The method also includes by an Radio Interface Layer (RIL) module that receives the request for a communication function from the app, selecting one communication module among a plurality of communication modules operated according to the type of the communication function. The method further includes by the RIL module, transmitting data to be transmitted according to the type of the selected communication module through a path that is directly formed with a first communication module, or by the RIL module, transforming data to be transmitted through a virtual communication module and performing a process of the transformed data through a path that is formed with a second communication module.

In a third example, an electronic device configured to provide a communication function on the basis of at least one network of a plurality of networks includes at least one communication module configured to provide a communication function based on a plurality of networks. The electronic device also includes a Radio Interface Layer (RIL) module configured to support the processing of data transmitted and received through at least one communication module of the communication modules. The electronic device further includes a virtual communication module configured to support the processing of data transmitted and received through at least one communication module among the communication modules and perform data processing through the RIL module, wherein the RIL module is configured to form a path with the communication modules, or form a path with the communication modules through the virtual communication module according to the type of communication function.

In a fourth example, a method for operating a communication function and an apparatus supporting the same can more effectively use a packet network connection and a circuit network connection of a communication function without changing an operating system installed in an electronic device.

In addition, a method and an apparatus as disclosed herein can support the optimization of a switching between a packet network connection and a circuit network connection.

Further, a method and an apparatus as disclosed herein can support the improved operation of a messaging service based on a packet network and a circuit network.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," is be inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller may be centralized or distributed, whether locally or remotely. Definitions for certain words and phrases can be provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
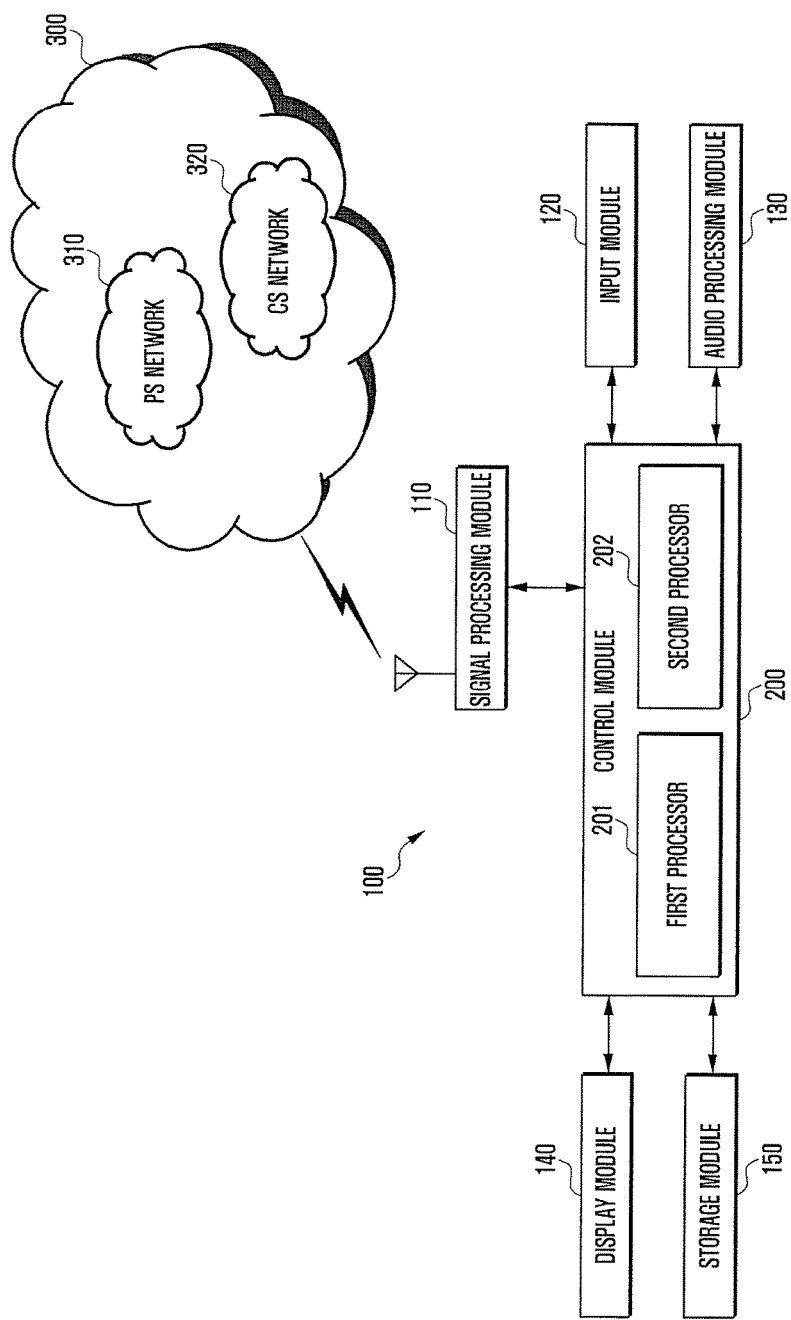
FIG. 1 is a block diagram schematically illustrating an example of a configuration of a communication function supporting system according to this disclosure.

FIGS. 1 through 8, discussed below, and the various embodiments used to describe the principles of the present disclosure in this patent document can be by way of illustration only and should not be construed in any way to limit the scope of the disclosure. Those skilled in the art will understand that the principles of the present disclosure can be implemented in any suitably arranged electronic device. Hereinafter, embodiments will be described in detail with reference to the accompanying drawings.

In describing embodiments, technical descriptions which are well known in the art and are not directly related to the present disclosure will be omitted. In addition, detailed descriptions of elements which have substantially identical configurations and functions in the present disclosure will not be repeated.

For the same reasons, some elements are illustrated exaggeratedly or schematically, or omitted, and the size of each element does not fully reflect the actual size in the accompanying drawings. Accordingly, the present disclosure should not be restricted by the relative sizes or distances shown in the drawings.

The electronic devices according to this disclosure can be devices adopting a communication function. These devices can be one or a combination of various electronic devices such as, for example, smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, electronic bracelets, electronic necklaces, electronic app accessories, cameras, wearable devices, electronic clocks, wrist watches, smart white appliances {such as refrigerators, air conditioners, cleaners, artificial intelligence robots, TVs, digital video disc (DVD) players, audio players, ovens, microwaves, washing machines, air purifiers, electronic frames, or the like}, various medical devices {such as a magnetic resonance angiography (MRA), a magnetic resonance imaging (MRI), a computed tomography (CT) machine, and an ultrasonic machine}, navigation devices, global positioning system (GPS) receivers, event data recorders (EDRs), flight data recorders (FDRs), set-top boxes, TV boxes (such as SAMSUNG HomeSync™, APPLE TV™, or GOOGLE TV™), electronic dictionaries, automotive infotainment devices, electronic equipment for ships (such as navigation equipment for ships, gyrocompasses, or the like), avionics, security devices, electronic clothes, electronic keys, camcorders, game consoles, head-mounted displays (HMDs), flat panel display devices, electronic albums, furniture or parts of buildings adopting a communication function, electronic boards, electronic signature receiving devices, projectors, or the like. It is obvious to those skilled in the art that the electronic devices according to his disclosure are not limited to the above-identified devices.

FIG. 1 schematically illustrates an example configuration of a communication function operating system according to this disclosure.

Referring to FIG. 1, a communication function operating system of this disclosure can include an electronic device 100 and a network 300.

The network 300 can include at least one communication network. Particularly, the network 300 can include a Circuit Switch (CS) network 320 that can process data on the basis of a circuit switch and a Packet Switch (PS) network 310 that can process data on the basis of a packet switch. The CS network 320 can include network device elements that can process data on the basis of a circuit switch. The PS network 310 can include network device elements that can process data on the basis of a packet switch. For example, the CS network 320 can be networks that can support communication methods of 2G or 3G. The PS network 310 can be networks that can support communication methods of 4G or 5G. Here, 2G, 3G, 4G and the like denote a generation of a specific communication method wherein each generation can include at least one communication method. That is, at least one communication method can support the PS network 310 and at least one modem or communication module can support the communication type. Also, at least one communication method can support the CS network 320 and at least one modem or communication module can support the communication method.

The electronic device 100 can be manufactured and operated with communication modules capable of operating the corresponding communication method in order to support the at least one communication method. In an embodiment, the electronic device 100 can include a plurality of communication modules which can be configured to connect with the PS network 310 and the CS network 320. Alternatively, the electronic device 100 can perform a connection with the PS network 310 and the CS network 320 using a single communication module. For example, a communication module provided in the electronic device 100 can perform a connection with the CS network 320 for operating a voice phone call function. In addition, a communication module of the electronic device 100 can perform a connection with the PS network 310 for operating a messaging service or a data communication function. Accordingly, even though the electronic device 100 can include a single communication module, the single communication module can be divided into a module for connecting with the CS network 320 to process communication data, and a module for connecting with the PS network 310 to process communication data. The electronic device 100 can also include a Radio Interface Layer (hereinafter referred to as "RIL") module and a virtual communication module, for example, a virtual IP Multimedia Subsystem (IMS) processor for a connection process with the CS network 320 and the PS network 310.

The electronic device 100 can perform signal processes based on the CS network 320 through the RIL, and can perform signal processes based on the PS network 310 through the RIL and the virtual IMS processor. Accordingly, since the electronic device 100 can use the RIL in common in processing signals based on the CS network 320 and the PS network 310, it can perform various communication function apps based on signals transmitted and received through the RIL. Further, the electronic device 100 can process signals based on the PS network 310 without alterations of an Operating System (OS) disposed above the RIL and communication function apps.

The electronic device 100 can include a signal processing module 110, an input module 120, an audio processing module 130, a display module 140, a storage module 150 and a control module 200.

In addition, the electronic device 100 can further include other modules such as, for example, a Wi-Fi communication module. The Wi-Fi communication module can be connected with the control module 200 and operated by a control thereof.

The signal processing module 110 can perform signal processes such as amplification and conversion of signals provided by communication modems or communication modules included in the control module 200. Also, the signal processing module 110 can transmit the processed signals through an antenna. In addition, the signal processing module 110 can convert or amplify signals received through the antenna to be thereby provided to the control module 200. Particularly, the signal processing module 110 can provide signals related to a communication function to a second processor 202 that can be provided to include communication modules.

The input module 120 can support a generation of signals related to the operation of the electronic device 100. This input module 120 can include at least one key button, side keys, a home key, a menu key, a power key, and the like. Further, the input module 120 can include a touch pad. Also, when the display module 140 is provided in the form of a touch screen, the input module 120 can include the display module 140. In an embodiment, the input module 120 can generate an input signal for requesting activation of communication function apps and an input signal for requesting deactivation of communication function apps according to a user's control. The generated input signals can be provided to the control module 200 to be used as instructions for activation of the corresponding communication function apps. The input signals for requesting activation of communication function apps can include at least one of, for example, input signals of activation of apps related to a communication function, input signals of activation of apps related to a messaging service, input signals of activation of apps related to video phone calls, and input signals of activation of web server connection.

The audio processing module 130 can perform processes of audio signals generated in the operation of the electronic device 100. For example, the audio processing module 130 can perform outputs of audio signals generated in the reproduction of certain audio files stored in the electronic device 100 or audio signals received from external electronic devices. The audio processing module 130 can perform a collection of audio signals in order to support a recording function or a phone call function of the electronic device 100. In an embodiment, the audio processing module 130 can output a guide sound or an effect sound upon connection with the CS network 320, a guide sound or an effect sound upon connection with the PS network 310, and a guide sound or an effect sound upon a hand-over between the CS network 320 and the PS network 310. This guide sound or effect sound can be omitted by a user's setup or a designer's design.

The display module 140 can output images required for operating the electronic device 100. For example, the display module 140 can provide a waiting image, a menu image, an icon image, and certain contents output images. The display module 140 can be operated as the input module 120, when it is provided in the form of a touch screen. The display module 140 can include a display panel, and a touch panel or a touch sheet. The display module 140 can support a finger touch, an electronic pen touch or a normal pen touch. To this end, the display module 140 can include a plurality of touch panels or touch sheets.

The display module 140 can output an operating image for communication function apps. For example, the display module 140 can output a dialer image, a call connection image, a calling image, and a call termination image for operating a communication function. The display module 140 can output a message receiving image, a message writing image, and a message transmitting image. Here, the messages can include short messages, multimedia messages, and e-mails. The display module 140 can output images based on data communication functions such as web connection images. The display module 140 can output a status bar on one side thereof. The status bar can include indicators corresponding to certain functions of the electronic device 100. For example, a battery indicator, an indicator showing an alarm setup, and the like can be displayed in the status bar. Further, an indicator referring to the type of communication network can be displayed in the status bar, and the communication network indicator can alter, in response to a wireless environment of the corresponding communication network, in real time.

Meanwhile, the certain communication function app images displayed on the display module 140 can be maintained regardless of the CS network 320 and the PS network 310 to be connected to perform the corresponding functions. That is, signals transmitted and received through the CS network 320 and signals transmitted and received through the PS network 310 can be output through the same communication function app image. In addition, signals for requesting certain communication functions can be transmitted through the CS network 320 or the PS network 310 according to a communication environment or a control of the control module 200 without changing the communication app images.

The storage module 150 can store data that is required for operating the electronic device 100 or generated in the course of the operation of the electronic device 100. The storage module 150 can store programs required to operate the electronic device 100. For example, the storage module 150 can store an operating system, at least one app, or the like. The operating system can perform processes of signals for controlling the operation of at least one app. The at least one app can be application programs corresponding to user functions provided by the electronic device 100. The at least one app can include communication function apps.

The communication function apps can include phone call apps, messaging service apps, and data communication apps such as video calls and web connections. These communication function apps can be operated on the basis of at least one of CS network 320 based function apps and PS network 310 based function apps, as set forth above. Alternatively, a single app can request the operation of the CS network 320 or the PS network 310 depending on the situation. Communication function apps stored in the storage module 150 can be loaded to the control module 200 and can be operated as a certain "app" by a user's request.

The control module 200 can perform controls of signal processes and data processes required for the operation of the electronic device 100. For example, upon the request of a certain app, the control module 200 can load the corresponding app from the storage module 150 and can perform the app to control the support of a specific function. That is, the control module 200 can load a communication function app and control the support of a phone call function, a messaging service function, or a data communication function on the basis of the app. Here, the control module 200 can include a first processor 201 and a second processor 202 to support the performance of communication function apps.

The first processor 201 can process various functions operated in the electronic device 100. For example, the first processor 201 can perform reproduction of audio files or image files. The first processor 201 can control operations of communication function apps. The second processor 202 can include at least one communication module. The second processor 202 can support transmission and reception of data according to the operation of at least one communication module in cooperation with the first processor 201.

The above-described first and second processors 201 and 202 will be described in detail with reference to FIG. 2.

Figure 2:
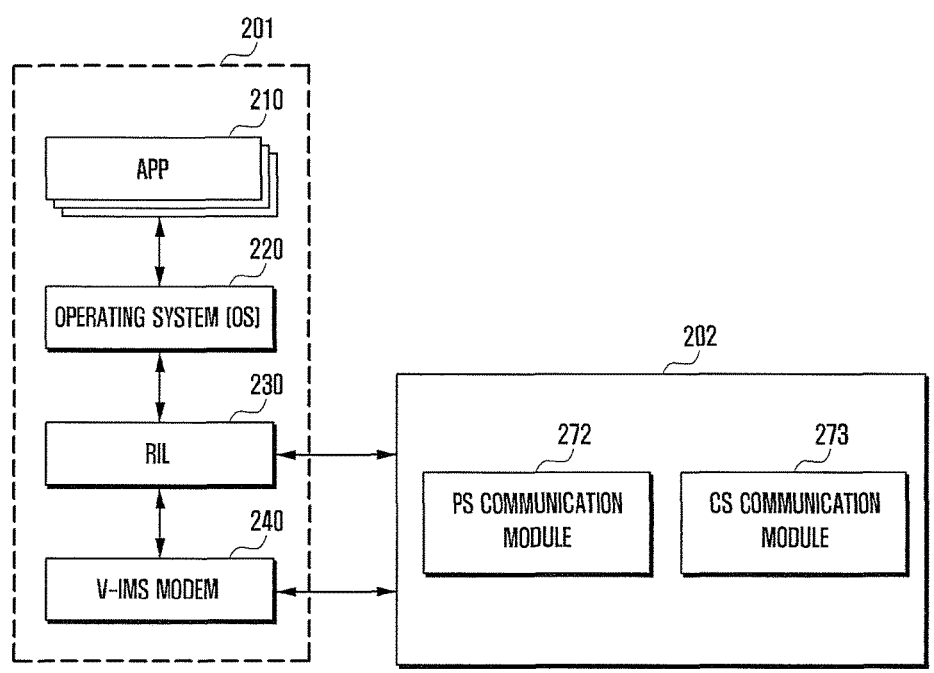
FIG. 2 is a block diagram illustrating an example of a configuration of a control module of an electronic device according to this disclosure.

FIG. 2 illustrates an example configuration of a control module 200 in an electronic device according to this disclosure.

Referring to FIG. 2, a first processor 201 can include at least one app 210 supporting a communication function, an operating system 220, an RIL 230, and a V-IMS modem 240. Here, the operating system 220 can be a partial framework, for example, a telephony framework, related to a communication function.

The at least one app 210 can be one of various application programs which can be performed in the first processor 201. For example, the at least one app 210 can be an audio reproduction app or an image reproduction app as set forth above. In an embodiment, the at least one app 210 can support a display function to display an input interface such as a dialer and a current voice call state. The app 210 can support to allow a user to select one of a PS network 310 based voice function and a CS network 320 based voice function. To this end, the app 210 can provide selection items of the PS network 310 based voice function and selection items of the CS network 320 based voice function. The function selection items can be provided to be paired with certain physical keys or can be provided as virtual key buttons to be output in the display module 140.

The app 210 can make a request to the operating system 220 for a voice call connection to a number requested by a user according to a user input. In addition, when an incoming voice call is received from a network, the app 210 can display the reception of a voice call through the operating system 220 and provide a function by which a user can accept or reject the call. The app 210 can support to transmit certain messages to other electronic devices through the operating system 220 by a user request, or to receive certain messages transmitted by other electronic devices to be thereby output in the display module 140.

The operating system 220 can generate and manage a context, for example, a voice phone call context, related to a communication function, and provide an application programming interface (API) for a voice call control to the app 210. When the app 210 requests transmission of a voice call through the API, the operating system 220 can transfer a dial request to the RIL 230. In addition, when an incoming call event resulting from the generation of incoming call is received from the RIL 230, the operating system 220 can transfer the incoming call event to the app 210. The operating system 220 can support information on a voice call state, for example, a number of the caller's electronic device or a current phone call state to the app 210 for reference.

The API can include routines for changing the setup of functions of additional services such as, for example, a call hold service, a caller ID restriction service, or the like.

The RIL 230 can provide a function of transforming the requests related to a voice call and a messaging service, such as a short messaging service, to control signals that can be recognized by the second processor 202. Accordingly, with the signal processes of the RIL 230, the operating system 220 can control the second processor 202 using the same request messages regardless of the type of hardware constituting the second processor 202. In addition, the RIL 230 can provide a function of transforming an event of reception of a voice call that is generated in the second processor 202 according to a voice call reception to an event that is recognizable by the operating system 220. The RIL 230 can determine which one of the PS communication module 272 and the CS communication module 273 of the second processor 202 can be to be operated by the request of the operating system 220. In addition, the RIL 230 can directly receive messages resulting from the operation of the CS communication module 273 of the second processor 202 and can transfer the messages to the operating system 220. The RIL 230 can transfer messages which are received by the PS communication module 272 of the second processor 202 to the operating system 220 through the V-IMS modem 240.

The RIL 230 can form a path on the basis of the V-IMS modem that can be a virtual communication module in processing data based on the PS communication module 272. Further, the RIL 230 can directly form a path with a certain communication module, for example, the CS communication module 273 in processing data based on the CS communication module 273. When a hand-over occurs from a state of a packet voice call connection based on the PS communication module 272 to a state of a circuit voice call connection based on the CS communication module 273, the RIL 230 can directly form a path with the CS communication module 273, then can transfer a change of a call state to the communication function app 210 through the operating system 220, and can control to transmit a message for releasing the packet voice call.

The virtual IP multimedia subsystem (V-IMS) modem 240 that is a virtual communication module can communicate with the RIL 230, and can provide a communication interface for the connection with the PS network 310. The V-IMS modem 240 can control the operations of functions based on a certain communication module of the second processor 202 for transmission and reception of data to and from the network 300. In this operation, the V-IMS modem 240 can perform a role of transforming the PS network 310 based data provided by a certain communication module of the second processor 202 to data that can be interpreted by the RIL 230 and providing the same to the RIL 230. Also, the V-IMS modem 240 can transform CS network 320 based signals provided to the RIL 230 to PS network 310 based data and can transfer the same to a PS network 310 support communication module of the second processor 202. This V-IMS modem 240 can be a virtual modem to transmit data using a data communication function of the second processor 202 without a direct communication function. The V-IMS modem 240 can transmit and receive messages in the form of a modem API that is similar to the form of a message transmitted and received to and from the second processor 202.

The V-IMS modem 240 of a virtual communication module can transform data provided from the RIL 230 to a data type to be transmitted through the PS communication module 272, and for example, can transform at least one of voice calls and short messages provided by the RIL 230 to a data type to be transmitted through the PS communication module 272. In addition, the V-IMS modem 240 can transform data received by the PS communication module 272 to a data type that is recognizable by the RIL 230, and for example, can transform at least one of voice calls and short messages received by the PS communication module 272 to a data type that is recognizable by the RIL 230.

The second processor 202 can support transmission or reception of data. The second processor 202 can include the PS communication module 272 and the CS communication module 273.

The PS communication module 272 can perform a connection with the PS network 310, and can transmit or receive data to or from the PS network 310. This PS communication module 272 can transmit a session forming request message, for example, an "INVITE" message for forming a session with the PS network 310, and can receive a response message from the PS network in response to the request. When the session is formed, the PS communication module 272 can transmit and receive voice calls or messages through the corresponding session. This PS communication module 272 can be a communication module including a wireless communication device supporting data communication method such as, for example, WCDMA, LTE, or the like, and can be a device supporting a packet call service through a base station of a mobile communication network.

The CS communication module 273 can perform a connection with the CS network 320, and can transmit or receive data to or from the CS network 320. The CS communication module 273 can form channels corresponding to phone calls with the CS network 320, and can transmit and receive voice calls and short messages. The CS communication module 273 can be a communication module including a wireless communication device that support call connection methods such as, for example, GSM, CDMA, WCDMA, or the like. This CS communication module 273 can be a device supporting voice phone calls or short message calls which can be converted through a switching center of the Public Switched Telephone Network.

Figure 3:
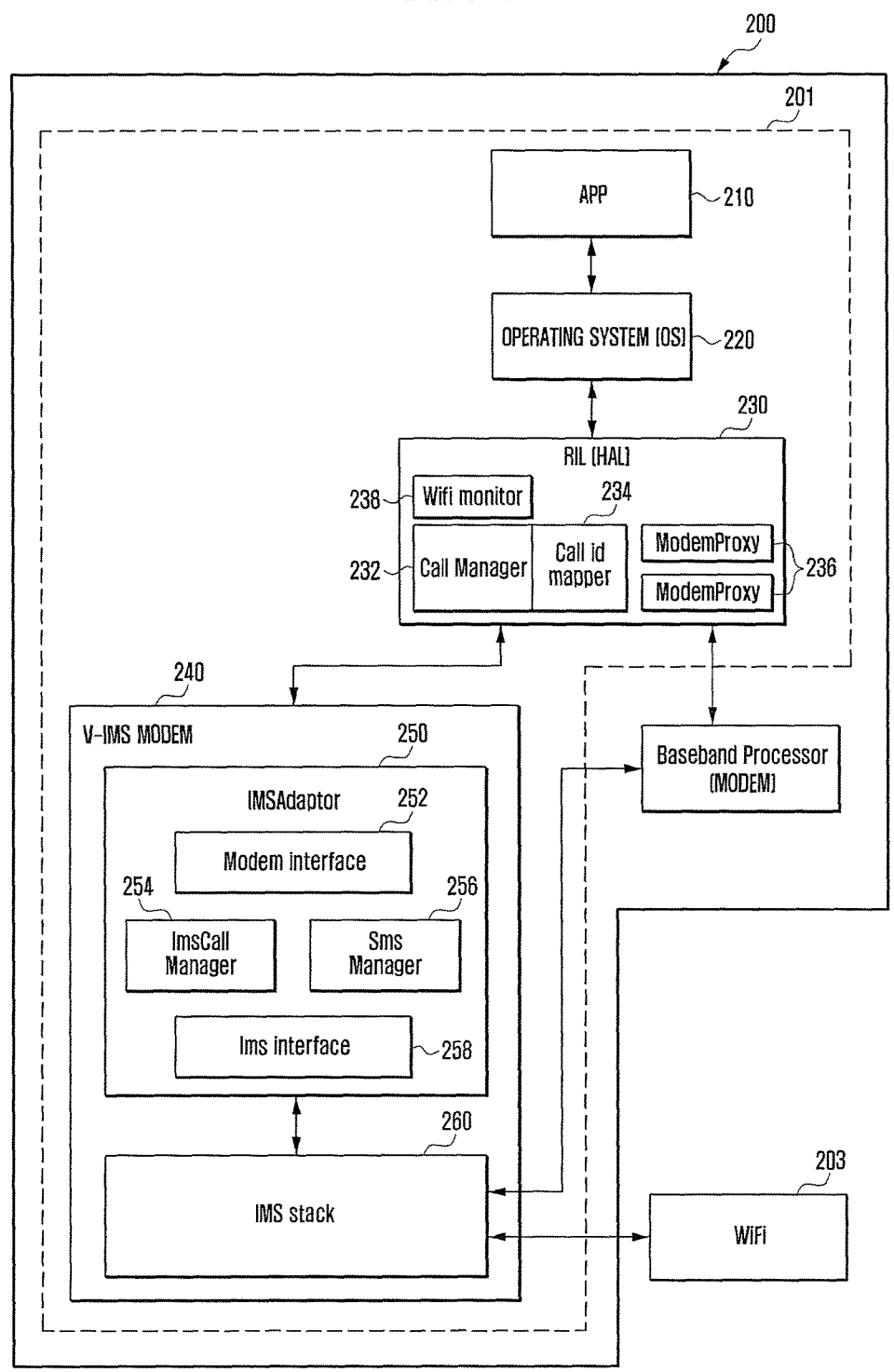
FIG. 3 is a block diagram more specifically illustrating example configurations of processors in a control module of an electronic device according to this disclosure.

FIG. 3 more specifically illustrates example configurations of a RIL 230 and a V-IMS modem 240 of a control unit of an electronic device according to this disclosure, and a Wi-Fi communication module 203 can be added. The Wi-Fi communication module 203 can be designed to be included in the second processor 202, but it can be separately provided in the electronic device 100. The Wi-Fi communication module 203 can transmit and receive data based on the PS network 310 through an AP connection.

Referring to FIG. 3, the RIL 230 can include a call manager 232, a call ID mapper 234 and a modem proxy 236.

The call manager 232 can manage voice call processes. The call manager 232 can manage an information list of each call for each modem proxy 236 in order to manage call information connected with a plurality of communication modules. The call ID mapper 234 can match several pieces of call information connected to each other in different networks, and can support to maintain the call information before and after a hand-over. The modem proxy 236 can manage information received from a plurality of communication modules including at least one communication module of the second processor 202 and the V-IMS modem 240.

The RIL 230 of the electronic device 100 can monitor a connection state of the Wi-Fi communication module 203 when the Wi-Fi communication module 203 is registered in the PS network 310, and can further include a Wi-Fi monitor 238 to determine a conversion to a CS network 320 based voice communication.

The V-IMS modem 240 can be comprised of an IMS adaptor 250 and an IMS (protocol) stack 260.

The IMS adaptor 250 can play a role of transforming an IMS API and a modem API of a communication module. The IMS adaptor 250 can include an ImsCall manager 254, a SMS manager 256, and an interface.

The ImsCall manager 254 can manage IMS calls and generate control instructions. The ImsCall manager 254 can generate and manage IMS session information and voice call context information.

The ImsCall manager 254 can transform an IMS session state to a circuit-typed call state. In addition, the ImsCall manager 254 can transform an SIP error code to a call control cause of a circuit call, and can allow the RIL 230 not to recognize a difference of an IMS session and a circuit call. That is, the ImsCall manager 254 can transform or interpret a message transmitted and received through the PS communication module 272 to a message type transmitted and received through the CS communication module 273, and can support to transfer the same. The storage module 150 of the electronic device 100 can store a mapping table of a data format used in the CS communication module 273 and a data format used in the PS communication module 272. The ImsCall manager 254 can convert a PS communication module 272 based data format to a CS communication module 273 based data format or a data format that can be recognizable by the RIL 230 using the mapping table. Also, the ImsCall manager 254 can transform a CS communication module 273 based data format or an RIL 230-recognizable data format to a PS communication module 272 based data format using the mapping table, and can transfer the same to the IMS stack 260. For example, the ImsCall manager 254 can call an IMS API corresponding to voice call transmission request received from the RIL 230, and can transmit an IMS call control message such as an "INVITE" message through the IMS stack 260. In addition, the ImsCall manager 254 can play a role of transforming IMS session state information received from the IMS stack 260 to a voice call context, and can transfer the same to the RIL 230.

An SMS manager 256 can send short messages received from the RIL 230 to the IMS stack 260, or can transfer short messages received from the IMS protocol stack 260 to the RIL 230.

The interface can include a modem interface 252 and an IMS interface 258.

The modem interface 252 can receive modem API messages from the RIL 230, and can transfer the same to the ImsCall manager 254 or the SMS manager 256. In addition, the modem interface 252 can transfer messages received from the ImsCall manager 254 or the SMS manager 256 to the RIL 230.

The IMS interface 258 can receive IMS events from the IMS stack 260 and can transfer the same to the ImsCall manager 254 or the SMS manager 256. Also, the IMS interface 258 can transfer communication instructions to the IMS stack 260 through the IMS API.

The above-described IMS interface 258 can be a module that provides interfaces with the IMS stack 260, and the interfaces with the IMS stack 260 can include logical interfaces such as functional calls on memories and hardware interfaces such as dual port RAMs or USBs. Accordingly, the location of the IMS stack 260 may not be limited due to the support of the IMS interface 258. For example, the IMS interface 258 and the IMS stack 260 can be disposed in the second processor 202 as well as the first processor 201.

The IMS stack 260 can generate and process IMS messages.

The IMS stack 260 can transform messages provided by the IMS adaptor 250 through the IMS interface 258 to an IMS message type. In addition, the IMS stack 260 can process an output of a message, for example, an "INVITE" message for forming a session with the network 300 using PS communication module 272 stored in the second processor 202. Further, the IMS stack 260 can receive IMS messages from the second processor 202, then can store the same temporarily, and can transfer the corresponding messages to the IMS stack 250 through the IMS interface 258.

As described above, the V-IMS modem 240 can enable the RIL 230 to control IMS calls on the basis of data processes similar to those of the second processor 202.

Figure 4:
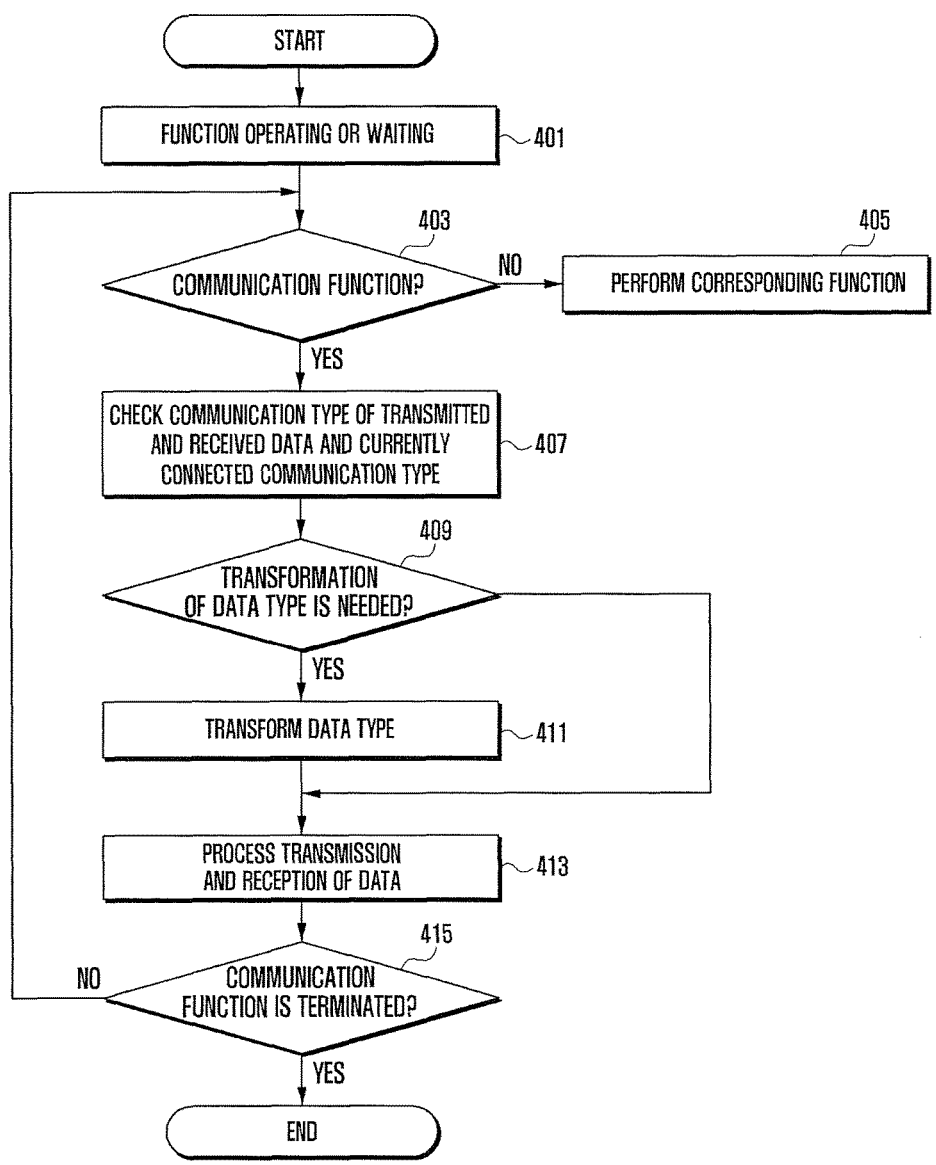
FIG. 4 is a flowchart illustrating an example method for operating a communication function in an electronic device according to this disclosure.

FIG. 4 is a flowchart illustrating an example method for operating an electronic device according to this disclosure.

Referring to FIG. 4, a method for operating an electronic device of the present disclosure can perform function operations or waiting in an operation 401. For example, a control module 200 of an electronic device 100 can control operations of certain functions and a function waiting such as outputting a waiting image or reproducing music according to per-set scheduled information or a user request.

In addition, when a certain event is generated, the control module 200 can check whether the corresponding event is for activating a communication function in an operation 403. In this operation, if the corresponding event is not for activating a communication function, the control module 200 can control the performance of a function according to a feature of the corresponding event in an operation 405. For example, the control module 200 can adjust a volume of reproduced music or control the performance of a function according to selection of a certain icon displayed in a waiting image.

If an event generated in the operation 403 is for activating a communication function, the control module 200 can check a communication method of transmission and reception of data and a currently connected communication method in an operation 407.

For example, the control module 200 can check whether the PS network 310 or the CS network 320 is currently connected in order to activate a voice call function. Further, the control module 200 can check whether a conversion to the CS network 320 is requested during the connection with the PS network 310, or whether a conversion to the PS network 310 is requested during the connection with the CS network 320.

Next, the control module 200 can check whether the type of data needs to be changed in an operation 409. For example, the control module 200 can check whether a communication channel based on the PS communication module 272 is formed for a voice phone call connection. If the type of data needs to be changed, the control module 200 can change the type of data in an operation 411.

In an embodiment, when a communication channel based on the PS communication module 272 is formed for a voice phone call connection, the control module 200 can perform a change of the type of data with respect to voice phone calls through the RIL 230 and the V-IMS modem 240, and can transfer the changed data to the PS communication module 272. When a communication channel based on the CS communication module 273 is formed for a voice phone call connection, the control module 200 can control to send voice phone calls through the CS communication module 273 of the second processor 202 by the RIL 230.

When voice phone calls are received through a communication channel based on the PS communication module 272, the control module 200 can transfer the received voice phone calls to the V-IMS modem 240. The V-IMS modem 240 can transform or interpret the received voice phone calls to a form that is recognizable by the RIL 230 and can transfer the same to the RIL 230. When voice phone calls are received through a communication channel based on the CS communication module 273, the control module 200 can transfer the received voice phone calls to the RIL 230 but not to the V-IMS modem 240. The RIL 230 can transfer the received voice phone calls to the app 210 through the operating system 220.

In an embodiment, when a communication channel based on the PS communication module 272 is formed with transmission of a message requested, the control module 200 can transfer a message to the RIL 230 and the V-IMS modem 240 to thereby perform a change of the data type of the message. In addition, the control module 200 can control to transmit the message of which the data type is changed through the PS communication module 272. Meanwhile, when the message is received through the PS communication module 272, the control module 200 can transfer the corresponding message to the V-IMS modem 240. Then, the V-IMS modem 240 can transform the received message to the data type that is recognizable by the RIL 230 and can transfer the same to the RIL 230. When a request for transmission of short messages is generated during the communication connection through the CS communication module 273, the first processor 201 of the control module 200 can directly transfer the message to the CS communication module 273 of the second processor 202, passing by the V-IMS modem 240. When the message is received through the CS communication module 273, the control module 200 can directly transfer the received message to the RIL 230. Here, the messages can be short text messages, long text messages, multimedia messages, or the like.

When the change of the data type is completed, the control module 200 can perform a process of transmitting and receiving data in an operation 413. Next, the control module 200 can check whether an event for termination of a communication function is generated in an operation 415. Here, if an event for termination of a communication function is not generated, the control module 200 can support the sequence to return to the operation 403 and then repeat the subsequent procedures.

Figure 5:
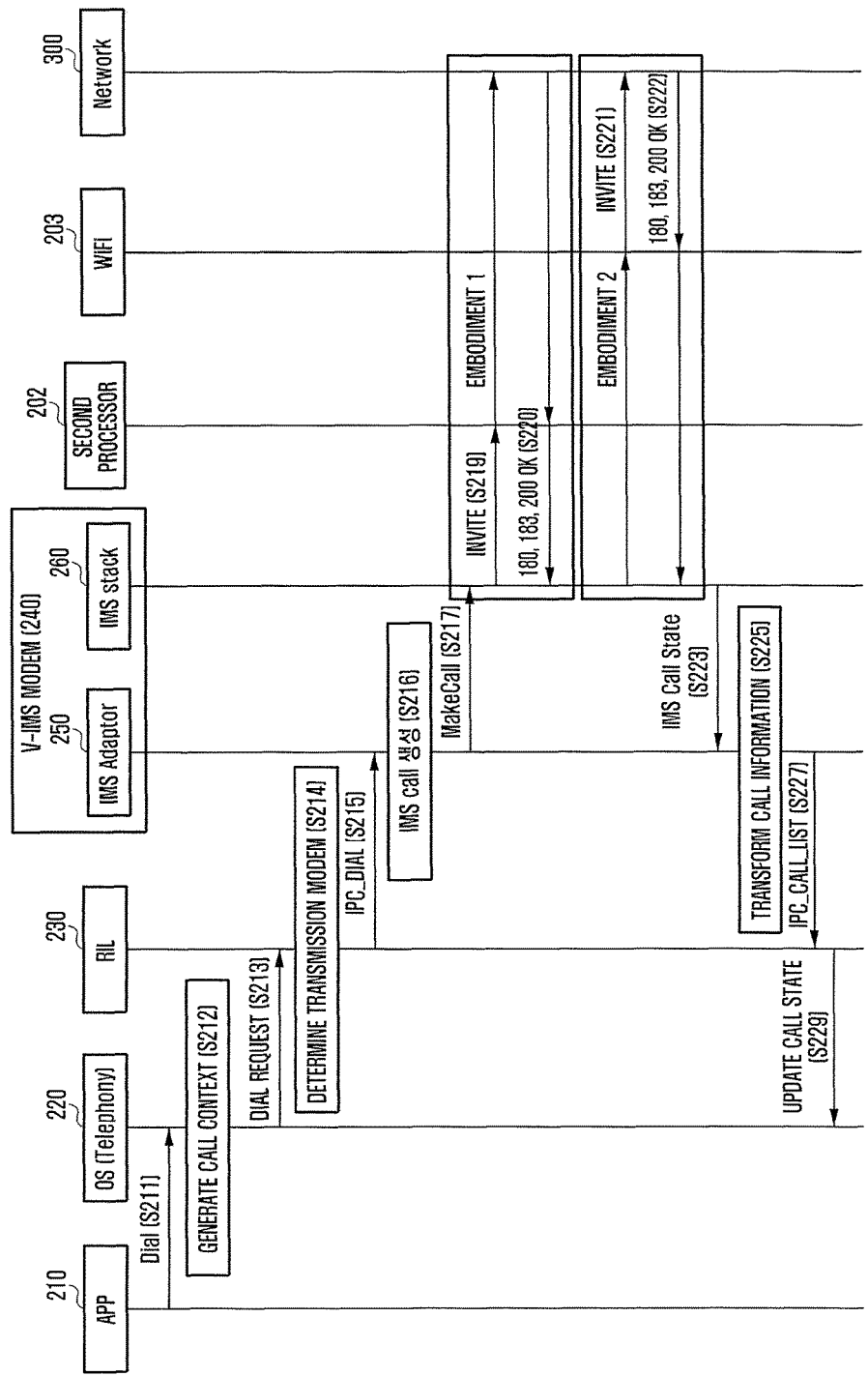
FIG. 5 illustrates an example process of transmission of a packet voice call in an operation of a communication function according to this disclosure.

FIG. 5 is a processing diagram of an example method for transmitting packet voice calls of an electronic device 200 according to this disclosure.

Referring to FIG. 5, when a user input of a request for voice call transmission is generated through a waiting image or the like, the corresponding input can be transferred to the app 210 supporting a communication function. Then, the communication function supporting app 210 can call a dial API provided by the operating system (Telephony) 220, then can support to display a dial image in the display module 140 (S211), and can receive a request for voice call transmission by a user input. The app 210 can transfer the received request for voice call transmission to the operating system 220.

The operating system 220 that has received the request for voice call transmission from the app 210 can generate a new voice call context (S212), and can transfer a dial request message that is a transmission message for voice call transmission to the RIL 230 (S213). The RIL 230 can determine a proper voice call from a packet voice call or a circuit voice call according to the type of voice call requested by the operating system 220 or voice call information supported by the network 300, and can select a communication module required for voice call transmission (S214).

In an embodiment, in a case of sending a packet voice call, the RIL 230 can send an "IPC-DIAL" signal corresponding to the request for voice call transmission to the V-IMS modem 240 (S215). Then, the IMS adaptor 250 can generate a IMS call corresponding to the request for voice call transmission provided by the RIL 230 (S216), and can perform an API call (MakeCall) for an IMS call transmission instruction of the IMS stack 260 using the generated IMS call (S217). The "IPC_DIAL" that is a call transmission modem instruction in the operation S215, or the call of "MakeCall" for an IMS call transmission instruction in the operation S217 can be different according to a configuration and the type of a communication module and the IMS, and they are not limited to certain forms.

The IMS adaptor 250 can generate an IMS call context with respect to an outgoing call in order to copy voice call information managed by the CS communication module 273 that is a circuit-typed voice modem of communication modules in the second processor 202 from IMS session information (S216). This management of a context can include copying of call state information (refer to 3GPP TS 24.008) defined by a circuit-typed voice of the second processor 202 on the basis of SIP message information received from the IMS of the network 300 and a call connection process. For example, in the operation S216, the IMS adaptor 250 can generate a new IMS call context, then can call a "MakeCall" instruction that is an IMS transmission API, and can configure the IMS call state as a mobile originating call proceeding state (S217).

According to a first embodiment, the IMS stack 260 that has received the "MakeCall" instruction can transmit a "SIP INVITE" message to the network 300 through the PS communication module 272 of the second processor 202 (S219). Here, the network 300 can include 2G, 3G, LTE base stations, switching centers, IMS servers, Wi-Fi wireless access points (APs), and the like. Afterward, the PS communication module 272 of the second processor 202 can receive a SIP state message from the network 300 and can transfer the same to the IMS stack 260. According to the SIP state message (S220), the IMS stack 260 can send an IMS call state change event to the IMS adaptor 250 (S223), and the IMS adaptor 250 can transform corresponding call state information according to the IMS event (S225). That is, the IMS adaptor 250 can update the call state information. Then, the IMS adaptor 250 can transfer the "IPC_CALL_LIST" corresponding to the updated call state information to the RIL 230 (S227). Here, the "IPC_CALL_LIST" of a state update message can include alerting, call established, call hold, call release, or the like. In addition, a method of transforming a SIP error code to a specific cause values for call control that is defined by 3GPP TS 24.008 can be included. In relation to release cause of call termination, the RIL 230 can transfer the call state update message received from the V-IMS modem 240 to the operating system (S229).

When the electronic device 200 is registered in the IMS network of the network 300 through a Wi-Fi network, the IMS stack 260 that has received the "MakeCall" instruction can transmit the "SIP INVITE" message to the network 300 through the Wi-Fi device 203 according to a second embodiment (S221). Afterward, the PS communication module 272 of the second processor 202 can receive the SIP state message from the network 300 (S222). Subsequent procedures for processing the received SIP state message can be performed as the same as in the first embodiment.

Figure 6:
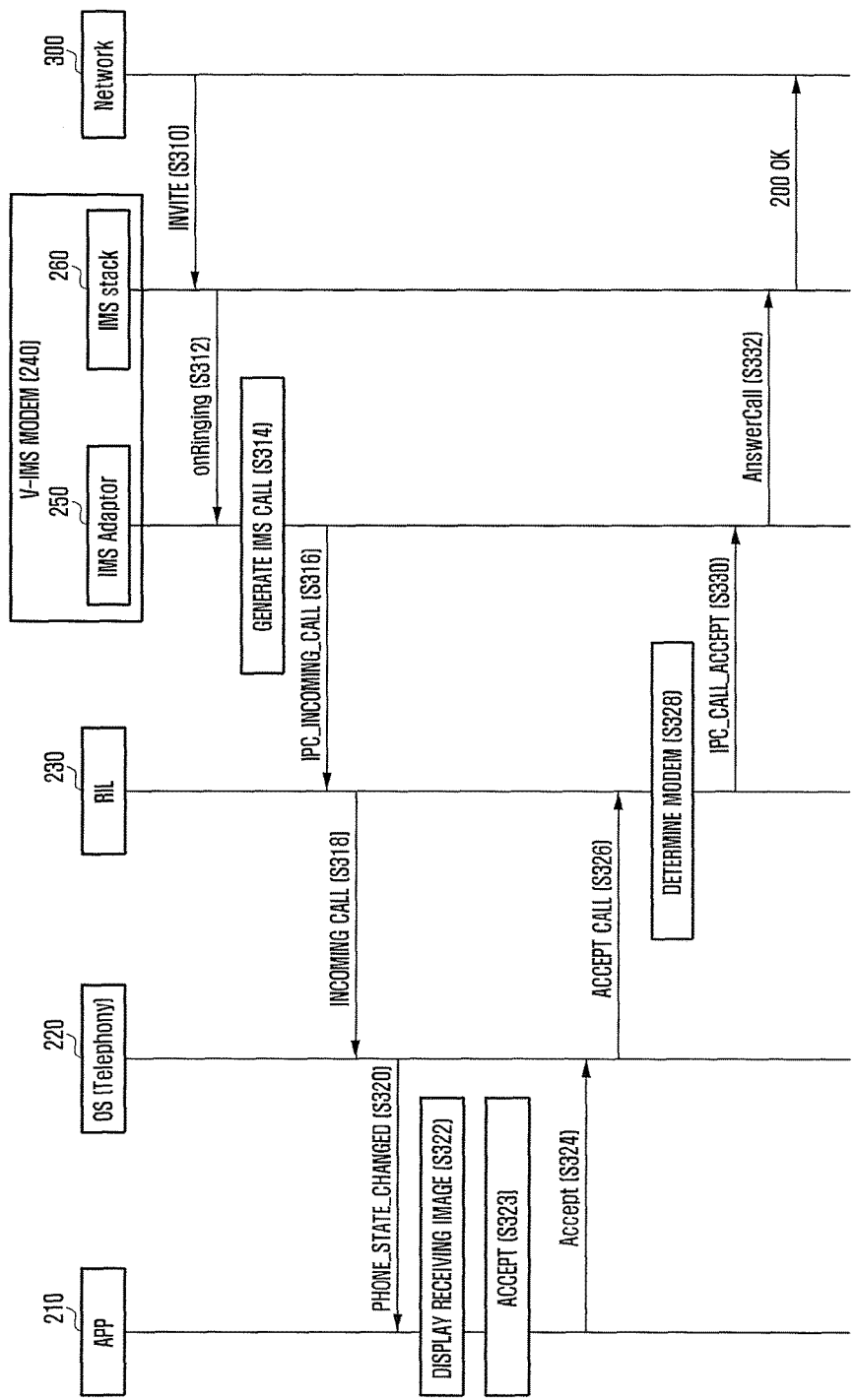
FIG. 6 illustrates an example process of reception of a packet voice call in an operation of a communication function according to this disclosure.

FIG. 6 is a procedure diagram of an example method for receiving packet voice calls of an electronic device 200 according to this disclosure.

Referring to FIG. 6, first, the IMS stack 260 can receive a "INVITE" message that is an IMS call request message from the network 300 (S310). Then the IMS stack 260 can transfer a call request event (onRinging) to the IMS adaptor 250 (S312). The IMS adaptor 250 can generate a new IMS call context (S314), and can transfer an "IPC_INCOMING_CALL" that is a call receiving modem massage to the RIL 230 (S316).

The RIL 230 can confirms that an incoming call is generated from the V-IMS modem 240, and can transfer an "INCOMING CALL" that is an incoming call message to the operating system 220 (S318). The operating system can transfer a "PHONE_STATE_CHANGED" to the app 210 according to the reception of the "INCOMING CALL" (S320), and the app 210, which is notified by the operating system 220 that an incoming call is generated, can display a call receiving image to a user (S322). When an input event of acceptance of incoming call is generated by a user's control (S323), the app 210 can call an "Accept" API of the operating system 220 and can transfer the acceptance of a voice call to the operating system 220 (S324). The operating system 220 can transfer an "ACCEPT CALL" message to the RIL 230 in order to transfer the acceptance message to the network 300 (S326). The RIL 230 can confirm that the "IPC_INCOMING_CALL" that is an incoming call message received in the operation S316 is received in the V-IMS modem 240, and can determine a certain modem that is a communication module to be operated in an operation S328. In addition, the RIL 230 can transfer an "IPC_CALL_ACCEPT" which is a call acceptance modem message to the V-IMS modem 240 (S330). The IMS adaptor 250 can find a call context to be accepted which is generated in the operation S314, and can call an IMS API "Answer Call" to accept the corresponding IMS session (S332). Meanwhile, the procedure of call state update can be the same as the operations S219 to S240 of FIG. 5.

Figure 7:
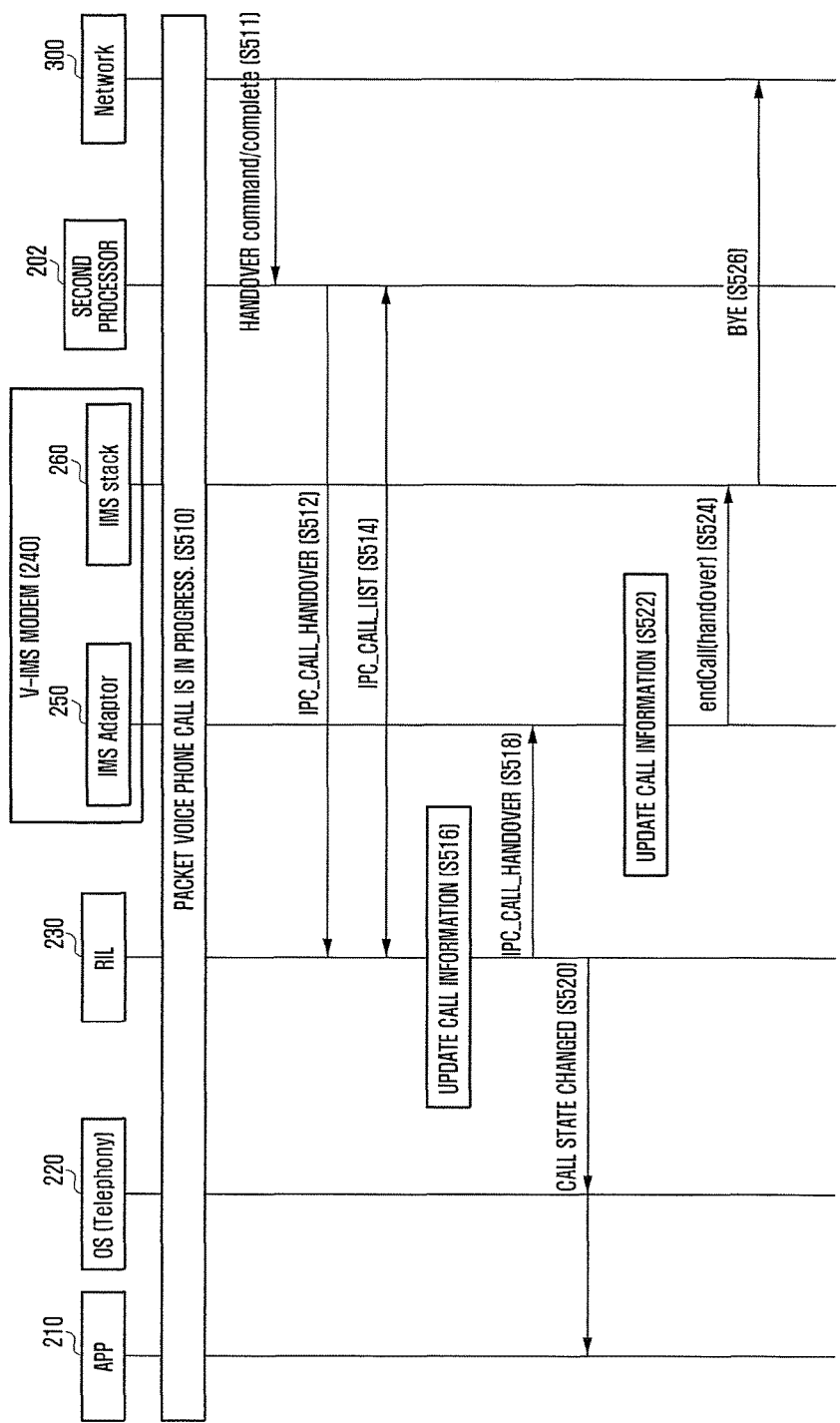
FIG. 7 illustrates an example process of a hand-over of a packet voice call in an operation of a communication function according to this disclosure.

FIG. 7 is a procedure diagram of an example method of a hand-over for transforming a packet voice call to a circuit voice call in the electronic device 200 according to this disclosure.

Referring to FIG. 7, it can be assumed that a phone call between the electronic device 200 and the network 300 is in progress by connecting a packet voice call through the second processor 202 (S510). For example, it can be assumed that the PS communication module 272 of the second processor 202 forms a communication channel with the PS network 310 of the network 300.

When it is determined that a conversion to a circuit voice call in the network 300 is needed because, for example, the electronic device 200 can leave the area where a packet voice network (S511) reaches, a communication module, for example, the CS communication module 273 of the second processor 202 can receive information on a circuit voice call from the CS network 320 of the network 300. Then, the second processor 202 can generate a circuit voice call, and can transfer the same to the RIL 230 by means of a modem message of "IPC_CALL_HANDOVER" (S512). The RIL 230 can receive a message, for example, an "IPC_CALL_LIST", showing that a new circuit voice call has been generated from the second processor 202 (S514), and can update typical packet voice call information made in the operation S510 with circuit call information (S516). The RIL 230 also can notify the V-IMS modem 240 of a hand-over event (S518). Further, the RIL 230 can notify the operating system 220 that a voice call state has been changed (S520). Here, the RIL 230 can concurrently perform the operations S518 and S520, or can perform the operation S520 first, and then the operation S518.

The IMS adaptor 250 can perform a call information update to wrap up the typical IMS call context (S522), and can call an IMS API "endCall" (cause: hand-over success) for wrapping up the packet voice call (S524). If possible, the IMS stack 260 can transmit a "BYE" message to the network 300 through an IMS service support communication module, for example, the PS communication module 272 of the second processor 202 to thereby wrap up the packet call (S526). The "BYE" message transmitted by the PS communication module 272 can be transferred to an IMS server of the PS network 310 in the network 300.

Figure 8:
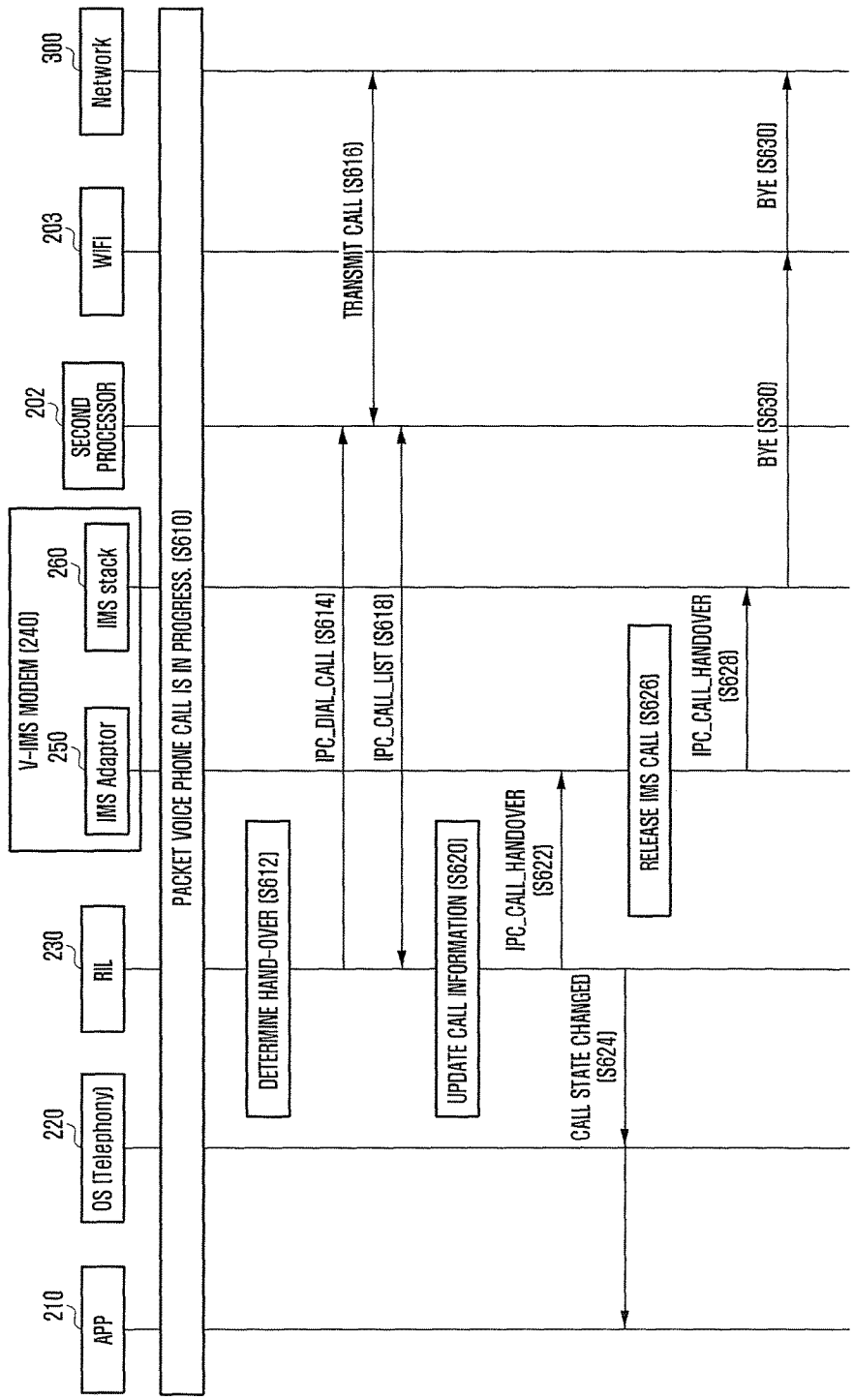
FIG. 8 illustrates an example process of a hand-over of a packet voice call in an operation of a communication function according to this disclosure.

FIG. 8 is a procedure diagram of an example method of a hand-over for transforming a packet voice call to a circuit voice call in an electronic device 200 according to this disclosure.

Referring to FIG. 8, it can be assumed that a phone call between the electronic device 200 and the network 300 is in progress by connecting a packet voice call through the Wi-Fi communication module 203 (S610). When the electronic device 200 determines a hand-over according to a decision in which a conversion to a circuit voice call is needed because of a Wi-Fi signal that is too weak to maintain a smooth phone call, a user's selection, a change of a call state, or the like (S612), the RIL 230 can transfers an instruction (IPC_DIAL_CALL) to generate a new circuit voice call for a voice hand-over to the second processor 202 (S614). For example, the RIL 230 can transfer a circuit voice call generation instruction to the CS communication module 273 of the second processor 202. Then, the second processor 202 can communicate with the network 300 to thereby perform call transmission for generating a new circuit voice call (S616). When the circuit voice call is generated, the second processor 202 can transfer a modem message of "IPC_CALL_LIST" as a circuit voice call state to the RIL 230 (S618). When the RIL 230 receives a message showing that a new circuit voice call has been generated from the second processor 202 (S618), the RIL 230 can update information of the typical packet voice call made in the operation S610 with circuit call information (S620). That is, the RIL 230 can perform an update of call information in the operation S620. Then, the RIL 230 can inform the V-IMS modem 240 of a hand-over event (S622). In addition, the RIL 230 can transfer "CALL STATE CHANGED" to the operating system 220 in order to notify the change of a voice call state (S624). The operating system 220 can transfer "CALL STATE CHANGED" to the app 210 in order to inform the change of a voice call state in operation S624.

The IMS adaptor 250 can perform an IMS call release to wrap up the typical IMS call context (S626), and can call an IMS API "endCall" (cause: hand-over success) for wrapping up a packet voice call. In addition, the IMS adaptor 250 can transfer an "IPC_CALL_HANDOVER" for wrapping up a packet voice call to the IMS stack 260 (S628). If possible, the IMS stack 260 can transmit a "BYE" message to the Wi-Fi communication module 203 (S630), and the Wi-Fi communication module 203 transmits the "BYE" message to the PS network 310 of the network 300 to thereby wrap up the packet call (S630).

The disclosure can provide a structure by which packet-type communication functions and circuit-type communication functions can be processed in the same procedures in the electronic device 100 that simultaneously provides packet-type communication functions and circuit-type communication functions. Accordingly, the electronic device and the components disclosed herein can allow users to use communication services such as a voice service, a short text service, or the like at the same method regardless of mobile communication networks. In addition, the IMS stack 260 for providing packet voice services can be abstracted as a virtual communication interface, so the electronic device 100 can be configured regardless of a configuration or the type of the IMS stack 260.

In addition, the electronic device and the components disclosed herein can provide state information of a packet-type voice phone call and a circuit-type voice phone call to the app in using a function of proving state information of a phone call to the app, which can be one of the primary functions of the operating system. Further, in a case of a hand-over from a packet voice call to a circuit voice call, the electronic device and the components disclosed herein may not involve an exchange of a context between packet voice phone call application programs and operating systems, so an effective hand-over can be achieved. Furthermore, since the electronic device and the components disclosed herein can be implemented through a single application program regardless of the situation in which short, long or multimedia messages can be transmitted through packet networks or circuit networks, the app can be simply configured.

Meanwhile, the above-described electronic device 200 can further include various additional modules according to this disclosure. That is, when the terminal is a communication terminal, the terminal can further include components which have not been mentioned above, such as a short distance communication module for short distance communication, an interface for data transmission/reception by a wired communication scheme or a wireless communication scheme of the terminal, an Internet communication module for communicating with an Internet network to perform an Internet function, and a digital broadcasting module for performing a function of receiving and reproducing digital broadcasting. Such structural elements can have various modifications which are not listed, according to a convergence trend of a digital device. However, a structural element having a level equal to the above-mentioned structural elements can be further included. Also, it goes without saying that, in the electronic device 200, a particular configuration can be excluded from the above-described configuration or can be replaced by another configuration according to embodiments of the present disclosure. This will be understood by those skilled in the art.

In addition, the terminals according to this disclosure can include all information technology devices and multimedia devices such as a Portable Multimedia Player (PMP), a digital broadcasting player, a Personal Digital Assistant (PDA), a music player (for example, an MP3 player), a portable game terminal, a smart phone, a notebook, and a handheld PC and application devices thereof as well as all mobile communication terminals operating based on communication protocols corresponding to various communication systems.

Although the present disclosure has been described with an exemplary embodiment, various changes and modifications can be suggested to one skilled in the art. It can be intended that the present disclosure encompass such changes and modifications as fall within the scope of the appended claims.

What is claimed is:

1. An electronic device providing a communication function on a basis of at least one network among a plurality of networks, the electronic device comprising:
a first processor including at least one communication module configured to provide a communication function based on the plurality of networks; and
a second processor including:
a Radio Interface Layer (RIL) module configured to support a processing of data transmitted and received through the at least one communication module; and
a virtual communication module configured to support a processing of data transmitted and received through the at least one communication module, the virtual communication module configured to perform data processes through the RIL module, the virtual communication module further configured to transform data to a data type that is recognizable by the RIL module;
wherein the at least one communication module comprises a packet switch based (PS) communication module and a circuit switch based (CS) communication module,
wherein the RIL module is configured to directly form a path with the CS communication module, and form a path with the PS communication module via the virtual communication module.

2. The electronic device of claim 1, wherein the virtual communication module is configured to transform data provided by the RIL module to a data type to be transmitted through the PS communication module.

3. The electronic device of claim 2, wherein the virtual communication module is configured to transform at least one of voice calls and short messages provided by the RIL module to a data type to be transmitted through the PS communication module.

4. The electronic device of claim 1, wherein the virtual communication module is configured to transform at least one of voice calls and short messages received by the PS communication module to a data type that is recognizable by the RIL module.

5. The electronic device of claim 1, wherein, after a hand-over occurs from a state of a packet voice call connection based on the PS communication module to a state of a circuit voice call connection based on the CS communication module, the RIL is configured to directly form a path with the CS communication module, then transfer a change of a call state to a communication function application through an operating system, and control a transmission of a message for releasing the packet voice call connection.

6. A method for operating an electronic device providing a communication function on a basis of at least one network among a plurality of networks, the method comprising:
receiving a request for a communication function from an application of the electronic device;
by a Radio Interface Layer (RIL) processing circuit that receives the request for a communication function from the application, selecting one communication module among a circuit switch based (CS) communication module and packet switch based (PS) communication module based on a type of the communication function;
by the RIL processing circuit, transmitting a data through a first path that is directly formed with the CS communication module; and
transforming, by a virtual communication module, a data to be transmitted through the PS communication module to a data type that is recognizable by the RIL processing circuit, and
by the RIL processing circuit, transmitting the transformed data through a second path that is formed with the PS communication module via the virtual communication module
wherein the electronic device comprises the RIL processing circuit, the CS communication module, the PS communication module, and the virtual communication module.

7. A method for operating an electronic device providing a communication function on a basis of at least one network of a plurality of networks, the method comprising:
receiving a phone call by a packet switch based communication module of a plurality of communication modules;
transferring the received phone call to a virtual communication module in a second processor and transforming a data related to the phone call to a data that is recognizable by a Radio Interface Layer (RIL) module;
transferring the transformed data to an operating system and an application via the RIL module,
receiving a phone call by a circuit switch based communication module of the plurality of communication modules; and
by the RIL module, transferring the received phone call to the operating system and the application through a path that is directly formed with the circuit switch based communication module, wherein the electronic device comprises the operating system, the application, the plurality of communication modules, the second processor and the RIL module.

8. The method of claim 7, wherein the transforming includes transforming at least one of voice calls and short messages to a data type that is recognizable by the RIL module.

9. The method of claim 7, further comprising:
receiving a request for a hand-over that is a request for a circuit voice call connection in a state of a packet voice call connection using the packet switch based communication module; and
by the RIL module, directly forming a path with a circuit switch based communication module, and transferring a call state change to a communication function application through the operating system.

10. The method of claim 9, further comprising transmitting a message for releasing the packet voice call connection by the RIL.

11. An electronic device providing a communication function on a basis of at least one network of a plurality of networks, the electronic device comprising:
a first processor that includes:
an application configured to support a communication function,
an operating system configured to support operation of the application,
a Radio Interface Layer (RIL) module configured to support a communication function of the operating system, and
a virtual communication module configured to transform circuit-type data provided by the RIL module to packet-type data, and transform received packet-typed data to a data that is recognizable by the RIL module; and
a second processor that includes:
a circuit switch based (CS) communication module configured to support the circuit type data; and
a packet switch based (PS) communication module configured to support the packet type data,
wherein the RIL module is configured to directly form a path with the CS communication module, and form a path with the PS communication module via the virtual communication module.

12. The electronic device of claim 11, wherein, after a hand-over occurs from a state of a packet voice call connection based on the PS communication module to a state of a circuit voice call connection based on the CS communication module, the first processor is configured to directly form a path with the CS communication module, then transfer a change of a call state to a communication function application through an operating system, and transmit a message for releasing the packet voice call connection.

* * * * *